(12) United States Patent
Baumgarten

(10) Patent No.: US 6,289,270 B1
(45) Date of Patent: Sep. 11, 2001

(54) METHOD FOR GENERATING CONNECTING PATHS WHICH CAN BE USED FOR GUIDING A VEHICLE TO A PREDETERMINED TARGET PATH

(75) Inventor: Goetz Baumgarten, Neubiberg (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/463,049
(22) PCT Filed: May 12, 1999
(86) PCT No.: PCT/DE99/01446
 § 371 Date: Jan. 18, 2000
 § 102(e) Date: Jan. 18, 2000
(87) PCT Pub. No.: WO99/60455
 PCT Pub. Date: Nov. 25, 1999

(30) Foreign Application Priority Data

May 19, 1998 (DE) ............................................. 198 22 508

(51) Int. Cl.$^7$ ............................ G05D 1/00; G01C 22/00
(52) U.S. Cl. .................... 701/26; 701/23; 701/42; 701/60; 701/209; 701/210; 180/168
(58) Field of Search .................................. 701/23, 26, 28, 701/42, 60, 201, 206, 209, 210, 223; 180/167, 168, 169; 318/568.12; 340/933, 942

(56) References Cited

U.S. PATENT DOCUMENTS

| 5,219,036 | * | 6/1993 | Schwager et al. | 701/26 |
| 5,233,526 | | 8/1993 | Detriche et al. | 701/26 |
| 5,350,912 | | 9/1994 | Ishida | 250/202 |
| 5,684,696 | | 11/1997 | Rao et al. | 701/25 |
| 5,752,207 | | 5/1998 | Sarangapani | 701/26 |
| 5,758,298 | * | 5/1998 | Gulner | 701/26 |
| 5,791,425 | * | 8/1998 | Kamen et al. | 180/7.1 |

FOREIGN PATENT DOCUMENTS

| 4209457 | 10/1992 | (DE) . |
| 0448060 | 9/1991 | (EP) . |
| 2309556 | 7/1997 | (GB) . |

* cited by examiner

Primary Examiner—William A Cuchlinski, Jr.
Assistant Examiner—Gertrude Arthur
(74) Attorney, Agent, or Firm—W. F. Fasse; W. G. Fasse

(57) ABSTRACT

A method and system generate multi-dimensional coupling paths for guiding vehicles to a destination path with a path dynamic unit (13), with a feedback control (11) for a closed loop control of at least one closed loop for sending feedback data (16, 17; 105, 106, 107) to the feedback control (11). A conversion module (15) is provided at the output of the path dynamic unit (13) for calculating destination path values (5) which are fed into the feedback control (11) as input values.

10 Claims, 4 Drawing Sheets

METHOD FOR GENERATING CONNECTING PATHS WHICH CAN BE USED FOR GUIDING A VEHICLE TO A PREDETERMINED TARGET PATH

FIELD OF THE INVENTION

The invention relates to a method for generating coupling paths. The method is useable for guiding a vehicle to a predetermined destination path. The invention also relates to a path generating system for carrying out this method.

DESCRIPTION OF THE RELATED ART

In connection with the automatic path guidance of vehicles, by which the vehicle is automatically guided with the aid of sensors along any multi-dimensional destination path, the vehicle must often first be guided to this destination path in a preceding step. This can be achieved on the one hand by a manual open loop control of the vehicle from the actual position to the destination path with and without specified inputs, or by an automatic guidance to the destination path. In both cases, however, a coupling path is required along which the vehicle is guided from the actual position to the destination path without overshooting, whereby particularly the entry into the destination path must lie within the controllability range of the vehicle.

From aviation, coupling paths are known which bring the airplane automatically to a rectilinear destination path or desired flight path.

Further, path generation systems have been developed for the generation of coupling paths to curved destination paths. In this context the coupling path is generated by assembling the coupling path from geometrical path elements. A disadvantage of the just mentioned method is that it requires a relatively large computation effort, and hence a respectively large equipment investment, if it is to be ensured that the method can generate a coupling path for any starting motion direction and for any starting position respectively relative to the destination path. A further disadvantage of the state of the art is seen in that the entire coupling path up to the merging into the destination path, must be generated before the vehicle itself is in the coupling phase, since only then can it be ensured that the coupling path is efficient.

SUMMARY OF THE INVENTION

It is an object of the invention to create a method of and a system for the generation of efficient coupling paths that start from any starting position to any specified destination paths that lie within the physical limits of the vehicle, but are otherwise independent of the vehicle, whereby the computational effort, and thus, the equipment expenditure shall remain as low as possible. In particular, the generated coupling path shall be free of breaks and shall take into consideration the performance and load limits of the vehicle, for example, lateral acceleration limits.

It is also an object of the invention to create a method and/or a path generation system for the generation of coupling paths by which the coupling paths merge with the destination paths without overshooting.

A further object of the invention is to create a method and/or a system for the generation of coupling paths, in particular for any curved, one or multi-dimensional destination paths that are also provided with variable evaluation factors or parameters along their course for taking into consideration, for example, aspects that change with time or preferred coupling ranges.

These objects have been achieved according to the invention by the combination of the following steps: mapping, by a path dynamic unit, geometric relationships of said at least one coupling path, controlling said path dynamic unit through a path dynamic feedback control, to thereby supply feedback data, also referred to as feedback values or signals, to said path dynamic feedback control for said controlling of said path dynamic unit. Destination path values or data or signals are then calculated by a conversion module connected to an output of the path dynamic unit. Further, at least a portion of the destination path values, data or signals is supplied as an input signal or signals to an input of the path dynamic feedback control.

According to the invention there is further provided a system for generating at least one coupling path for guiding a vehicle to a specified destination path, wherein the system is characterized by a path dynamic unit, a feedback control for a closed loop control of said path dynamic unit, at least one feedback conductor for sending feedback data to said feedback control, a conversion module connected to an output of said path dynamic unit for calculating destination path values, said conversion module comprising an output connected to an input of said feedback control for feeding said destination path values as input values or signals to said feedback control.

In this context, the geometrical relationships of the coupling path that are independent of the vehicle, are mapped or imaged onto a dynamic model. This model is controlled by specifying a feedback or closed loop control target. The feedback control target can thereby be described by an instruction to bring the distance of the coupling path from the destination path to the zero value, or by a similar instruction.

An advantage of the invention is that the path generation is precisely cycled to match the cycle time or rate of the series connected path feedback control, so that the path generation provides the calculated discrete coupling path points to the path feedback control at the cycle time rate at which the path feedback control requires the calculated discrete coupling path points.

A further advantage of the invention is that, in addition to the coupling path points, further signals such as the path angle of the coupling path or the lateral acceleration of the vehicle on the coupling path, can be picked up from the path generation. Such additionally picked up signals can also be provided to other modules or systems, for example, the closed loop path feedback control. A servo control effect which can facilitate the path feedback control, can also be achieved with these further signals. Thus, it is also possible to supply the coupling path to the path feedback control, for example, in the form of data sets that contain the angle of direction and velocities, rather than in the form of position points.

In phases of the coupling path generation in which the path generation can proceed in simplified form, it is also possible to switch off corresponding components of the path generation without reducing the safety, or in other phases, depending on the requirements, to switch on components, since the path closed loop feedback control remains uninfluenced thereby.

With the path generation system according to the invention, coupling paths can be generated that merge with the destination path without overshooting. Thus, it is particularly possible to also use the path generation system for the generation of coupling paths to specified or also generated low level flight paths for aircraft, since with this system, together with a corresponding path closed loop feedback control, it is avoided that the aircraft comes near the ground or flies too low.

BRIEF DESCRIPTION OF THE DRAWINGS

The invention will be described below with reference to the attached FIGS. They show.

DETAILED DESCRIPTION OF PREFERRED EXAMPLE EMBODIMENTS AND OF THE BEST MODE OF THE INVENTION

Figure 1:
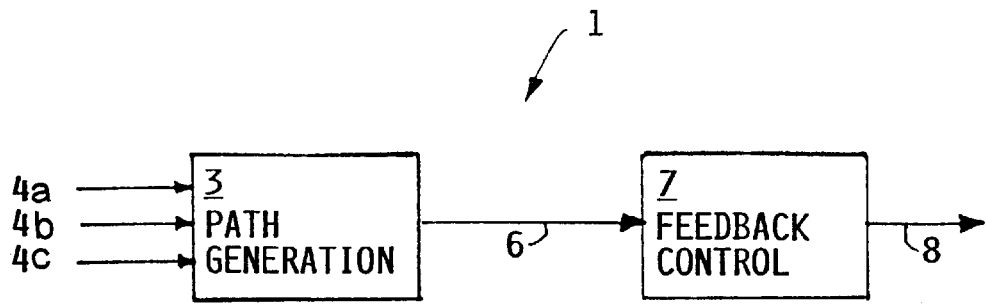
FIG. 1 a functional illustration of the path guidance system according to the invention, with the path generation and the path feedback control.

FIG. 1 shows a path guidance system 1 with a coupling path generation module referred to as path generation 3 and a path feedback control or module 7 referred to as closed loop path feedback control 7 or simply as feedback control 7. The path generation 3 includes modules for performing at least one mode of operation with which, under boundary or limiting conditions that are specified with the mode of operation, at least one coupling path is ascertained for a destination path that is also specified. The path generation 3 receives initialization values 4a that are entered manually or from other modules as input values or signals, which are preferably variables of the vehicle status. If applicable, the path generation receives a specified mode of operation 4b, when the path generation includes more than one mode of operation, and the necessary destination-path specified or rated inputs 4c, depending on the mode of operation. Alternatively, these data 4a, 4b, 4c can also be supplied, during the processing, to the path generation 3 by another module that is connected to the path generation 3. The path generation 3 sends coupling path data 6 as output values to the feedback control 7. The path feedback control 7 has the function of holding the vehicle to the calculated coupling path, even under the influence of external disturbances that are acting on the vehicle. The path feedback control 7 sends in turn the correction variables 8 as output data to the control systems, not shown in the Figs., for maneuvering the vehicle along the coupling path calculated according to the invention.

Figure 2:
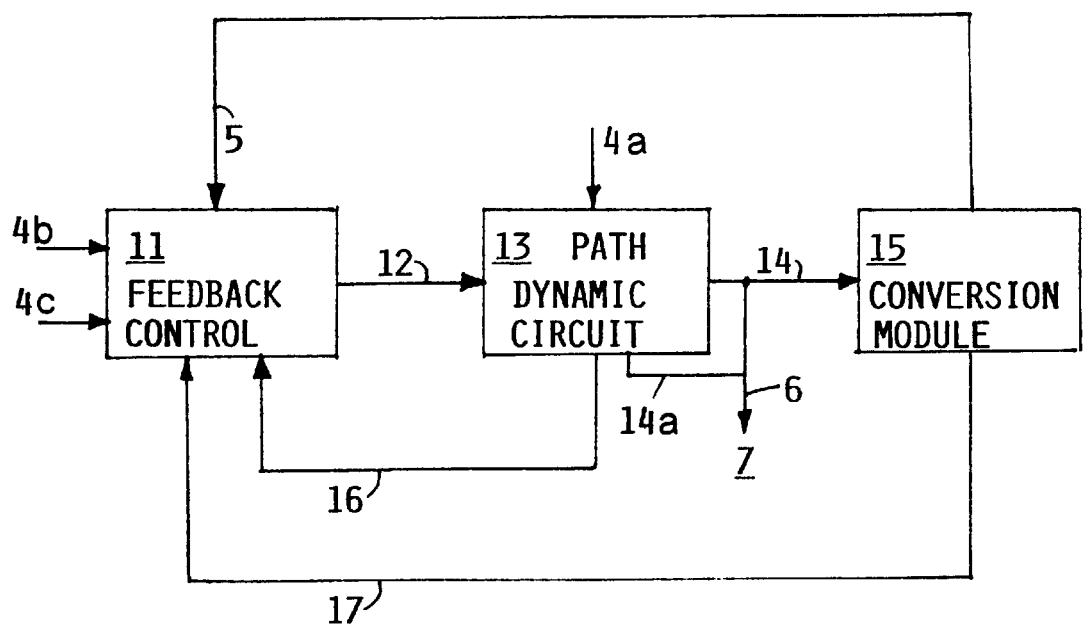
FIG. 2 a functional schematic block diagram of the path generation according to the invention.

FIG. 2 represents the path generation 3 according to the invention. The path generation 3 includes a closed loop feedback control device or a path dynamic feedback control 11 that delivers data 12 to a path dynamic or a path dynamic unit 13 which in turn supplies data 14 to a device for calculating destination path data also referred to as conversion module 15. The path dynamic feedback control 11 also receives feedback data 16 from the path dynamic unit 13 and feedback data 17 from the conversion module 15. The path dynamic feedback control 11 also receives as input variables from a module outside of the path guidance system 1, if applicable, the modes of operation data 4b, the destination-path rated inputs 4c, and destination path data or values 5 from the conversion module 15. The path dynamic 13 receives, in addition to the data 12 coming from the path dynamic feedback control 11, the initialization values 4a, whereby the latter can be supplied at the beginning of the path generation process to the path dynamic feedback control 11 or also to the conversion module 15. The coupling path data 6 that are supplied to the path feedback control, can include the data 14 for the conversion module 15 and/or other data 14a from the path dynamic 13. The terms "data" or "values" intend to cover respective electrical signals.

Figure 3:
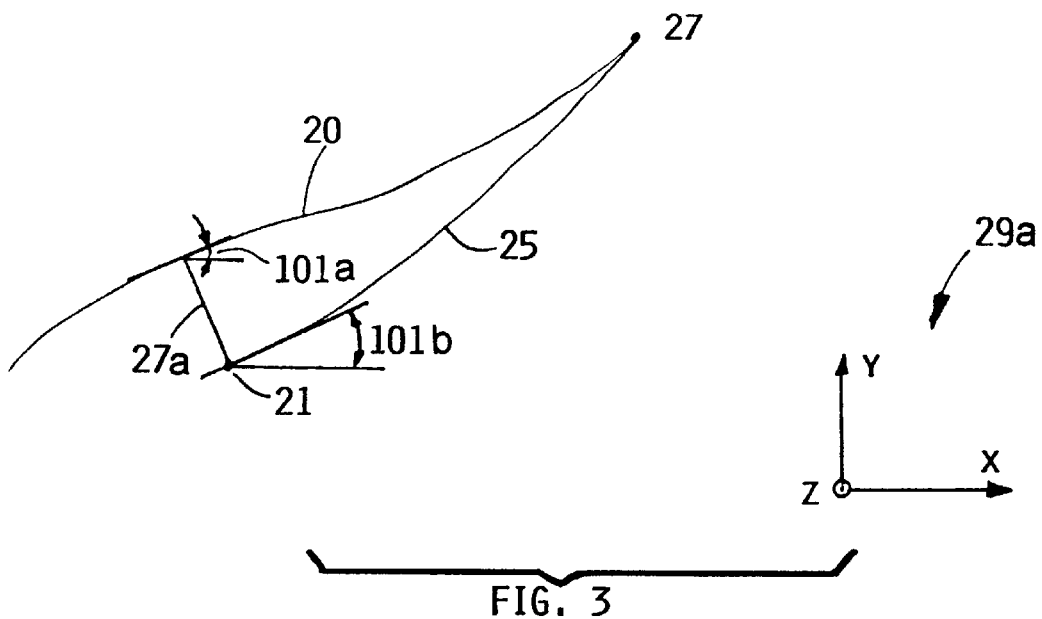
FIG. 3 an example illustration of a horizontal destination or target path and the corresponding calculated coupling path.

FIG. 3 shows a destination path 20 that runs in a horizontal plane and the actual position 21 of the vehicle that is determined at the beginning of the path generation process with the aid of a conventional sensor unit. The actual vehicle position 21 is at a distance 27a from the destination path 20. The reference number 29a designates a fixed coordinate system with the coordinates x, y, z to which the geometrical operands of the path generation 3 have reference. Based on the respective mode of operation selection, the path generation 3 calculates a coupling path 25 that also runs in the horizontal plane and merges with the destination path 20 at the merge point 27.

Figure 4:
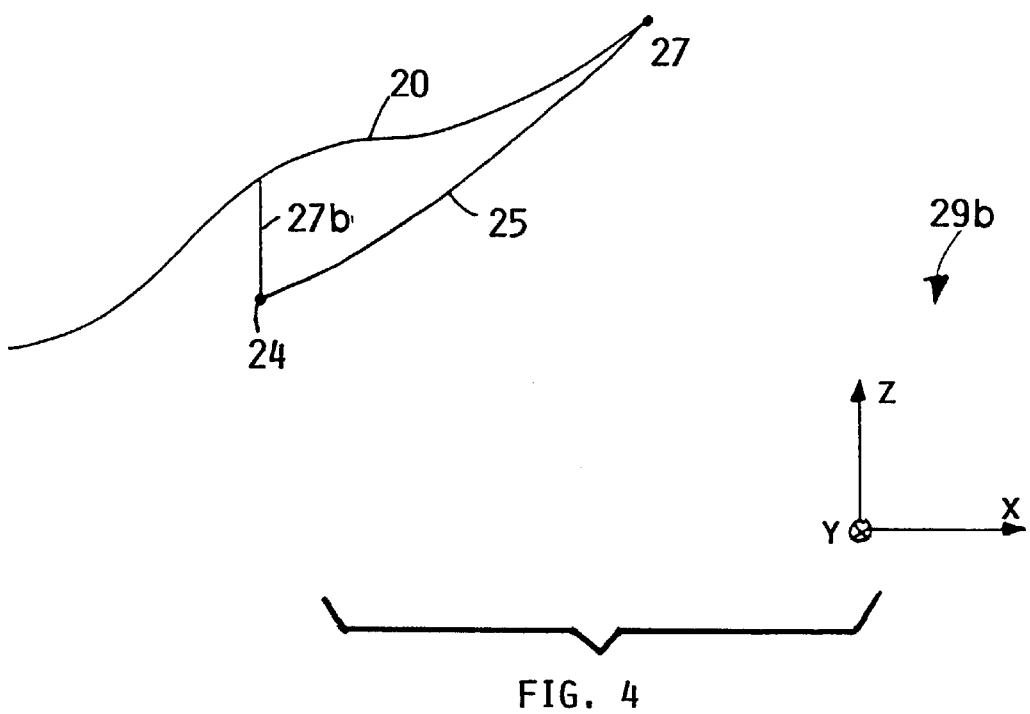
FIG. 4 an example illustration of a destination path determined only in its altitude course and the corresponding calculated coupling path.

FIG. 4 shows an example of a one-dimensional destination path 20 and of a coupling path 25, whereby information analogous to that shown in FIG. 3 has been provided with the same reference numbers. The course of altitude shown in FIG. 4 is the destination path 20 that is known prior to the coupling path generation process and that is to be fed as corresponding data to the coupling path generation 3. An aircraft with an initial altitude 24 is to be guided to the destination path along the coupling path 25 that is to be calculated, based on the corresponding selected mode of operation. The initially existing altitude spacing or distance between the aircraft and the destination path 20 is designated by the reference number 27b. A coordinate system suitable for this mode of operation is designated by the reference number 29b.

The initialization values or signals 4a that are particularly required for starting the path dynamic 13 are actual values or status values of the vehicle at the beginning of the path generation process. These actual values can include, for example, the horizontal position, the instantaneous altitude above ground, or a directional value, as well as a combination of these values, and a combination of these values with other values. These values are determined at the beginning of the path generation process by means of a conventional sensor unit, not shown, or are available at this time in some other way. The path dynamic 13 requires the initialization values or signals 4a prior to the path generation process, since functions performing components of the path dynamic 13, such as integrators, require initial values for the generation process. Which actual coordinates and in which form these are required by the path dynamic 13 depends on the mode of operation or on the embodiment of the path generation 3. In one embodiment of a path generation 3 for a coupling path 25 according to FIG. 3, the necessary initialization values or signals 4a of the actual position can exist in the form of the corresponding x, y coordinates, the velocity, and an instantaneous direction of travel of the vehicle in the x-y plane.

The destination path data or values 5 that are sent from the conversion module 15 to the path dynamic feedback control 11, are data that describe the instantaneous course of that point or range of the destination path 20 that is relevant for the respective iteration step or path generation cycle. Which point or range is relevant in a cycle of the path generation process depends on how, in a mode of operation of the path generation 3, the distance 27a, 27b of the actual position 21 from the destination path 20 is defined in the respective iteration step, or from other aspects, such as specified inputs with reference to the possible merge point. The destination path data or values 5 can include the respective destination path coordinate, as well as its first, second, and further derivation or derivations with reference to the arc length in the corresponding coupling path range. Thus, the data can include, for example, the direction and curvature of the destination path 20 in this coordinate, as well as values or signals derived therefrom. Instead of derivations with reference to the arc length, these can also be derivations with reference to path tracks in certain coordinate planes (for example, a flight track in the x-y coordinate plane) or derivations in certain coordinate axes or similar features. Preferably, the velocity or lateral acceleration values, that may be variable, of the vehicle on the corresponding destination path, are used for producing derived values from the mentioned values. These values are defined along the respective section of the destination path 20, and extend, for example transversely to the direction of the destination path. The derived values may be derived from a measured or assumed velocity of the vehicle. Which destination path data or values 5 are supplied from the conversion module 15 to the path dynamic feedback control 11 depends not only on the selected mode of operation, but also on the range for which the coupling path points are calculated in the respective iteration step. Thus, in the normal case, in the final phase of determining the coupling path 25, all data of the feedbacks 16, 17 and all available destination path data 5, are processed in the path dynamic feedback control 11. By contrast, possibly during the beginning phase of determining the coupling path, when the vehicle is at a relatively large distance from the coupling path 25, only a subgroup of the total destination path data or values 5, such as the destination path coordinates and their first derivation, the destination path direction, but not their second derivation, is used by the path dynamic feedback control 11.

The path dynamic 13 causes in each iteration step the calculation of the geometrical data 14 that are specific to the coupling path, from the data 12 which form the input data of the path dynamic 13, for example, in the form of the coordinates of the coupling path point calculated in an iteration step. The input data 12 of the path dynamic 13 are to be defined depending on the type of use and the mode of operation. For example, the lateral or cross acceleration of the vehicle is provided for this purpose. The path dynamic 13 includes preferably integrators for integrating the data 12 into the data 14 that correspond to the respective coupling path coordinates to be determined. The path dynamic 13 can furthermore include one or more amplifier elements, signal limiting elements and still further components. The physical limits of the vehicle in the coupling path 25 can be taken into consideration by the signal limiting elements.

In each iteration step of the path generation 3, at least one set of coupling path coordinates is determined, for example, in the form of three coupling path coordinates or the required coupling path angle and the coupling path velocity, or another suitable combination of variables. This is done preferably in a time period during which the vehicle is moving on the coupling path. As an alternative thereto, the coupling path could also be generated before the vehicle is moving on the coupling path. The latter can be practical when the vehicle in this time period is in a fixed position to the destination path, for example a spacecraft in a stationary position relative to a space station.

The path dynamic feedback control 11 processes the mode of operation inputs 4b, destination-path specific or rated inputs 4c, depending on the type of use initialization variables 4a, and the destination path data 5 coming from the conversion module 15 and the feedback data 16, 17. The destination-path specific or rated inputs 4c are formed preferably either from the rated distance to which particularly the variable zero is assigned, or from the destination path data belonging to the distance 27a, 27b. The destination path data values 5 are determined by the distance to be defined for each mode of operation between the respective coupling path point and the destination path or the respective destination path point or the respective destination path coordinates and their derivations or the lateral velocity and the lateral acceleration of the vehicle on the destination path resulting from the assumed vehicle velocity. The feedback data 16 include coupling path data, particularly their direction, their coordinates, and the derivation of the coupling path direction, for example, with respect to arc length, and if applicable, further derivations. The feedback data 17 include data that also contain coupling path data and can be based additionally on destination path data, such as the distance 27a, 27b of the most recently generated coupling path point to the destination path. The path dynamic feedback control 11 can include a module (not shown) that ensures that only portions of these data or values are processed. The path dynamic feedback control 11 can furthermore include a preliminary control. Such a preliminary control manages only rated inputs as input control data, and no feedback data 16, 17, that is to say, no information on the coupling path data or values, and can particularly contain additional information about the path dynamic. The preliminary control data are processed or produced within the path dynamic feedback control 11 and are then fed to the feedback control circuit within the path dynamic feedback control 11 by means of a mathematical operation, for example, by addition.

Based on FIG. 3, the function of the path generation 3 according to the invention will be described as follows:

At the beginning of the path generation a destination path 20 is predetermined and the vehicle is in its actual position 21 that lies at any distance from the destination path and was ascertained by a sensor unit not shown. Depending on the distance from the destination path 20 and on further influence values or variables, a certain mode of operation is selected manually or automatically, if several modes of operation are provided for in the path guidance system 1. For example, with a course of altitude as destination path 20, the mode of operation "one-dimensional vertical coupling path" or a mode of operation for generating a two-dimensional coupling path 25 to a two-dimensional destination path 20 is selected. The information on the mode of operation is then transmitted to the path generation 3 as a preliminary input.

After selecting the mode of operation, it may be necessary to specify a suitable feedback control target. This target is then either generated by the path dynamic feedback control 11 or, based on a manual input or from a corresponding other module, is sent to the path dynamic feedback control 11. For certain modes of operation, the control target is preferably the zero value for the distance to be reached between the coupling path 25 and the destination path 20 at a merge point that must still be determined. Alternatively, the feedback control target is determined by the coordinates of the destination path 20 which coordinates are determinative for ascertaining the distance from the actually generated coupling path point to the destination path 20.

Based on the destination path 20 and the actual position 21 of the vehicle, the relative location of the actual position 21 of the vehicle with respect to the destination path 20, that is, the distance, is determined. In order to determine the relative location of the vehicle with respect to the destination path 20, the distance 27a, 27b is defined during or in the course of the process. The distance 27a, 27b can be defined, starting from the actual position 21, as the line of the shortest distance 27a to the destination path 25. To determine the shortest distance 27a it can be provided that, in each cycle, the distance that is determined is the distance between the coordinates of the coupling path point ascertained in the preceding cycle to all destination path coordinates or a group of destination path coordinates, whereupon the shortest distance and the corresponding destination path point or a subset of destination path points, is calculated. Another method, however, can be provided for the definition and determination of the instantaneous distance. For example, it can be practical to calculate the distance as the difference in altitude between the coupling path point ascertained in the preceding cycle and the destination path point lying vertically above it, in order to generate a coupling path 25 to a destination path 20 that is determined only in its altitude course. Other definitions of the distance 27a, 27b may also be practical, for example, in order to take into account ranges in which the coupling path 25 is not supposed to merge with the destination path 20. Furthermore, in the case, in which the mentioned shortest distance between the actual position 21 of the vehicle and the destination path 20 falls below a predetermined value or below a value to be determined in the path generation 3, another type of distance determination is provided. In that case the shortest distance to the connecting straight line of two neighboring path points or the distance to a curve that goes through the relevant destination path points is used as the distance for calculating.

The coupling path generation must be initiated before the process begins. For this purpose initialization values 4a are supplied particularly to the path dynamic 13, or also to the feedback control device 11 or also to the conversion module 15. The initialization values 4a are typically vehicle status values and generally data or values that are suitable to initiate the integrators and, if applicable, further functions of the path dynamic 13, so that a value is allocated to these functions, which value is relevant for the first iteration step.

The path generation 3 generates a coupling path 25 within a specified step width by using the data or values of the destination path 20 and of the actual position 21. The step width corresponds for example to a time slot determined by the cycle rate of the computer for the path feedback control. In this context, the destination path data or values 5 provided initially for the respective cycle and feedback data 16, 17 are processed in each calculation cycle in the path dynamic feedback control 11. The destination path data or values 5 fed to the path dynamic feedback control 11 are calculated in the conversion module 15, that is, are converted particularly into the geometry data required for the path dynamic feedback control. The data or values 12 determined in the path dynamic feedback control 11 are fed to the path dynamic 13 and are processed to form data or values 14 by means of the path dynamic 13. In the respective cycle the data or values 14 correspond to the coupling path coordinates 6 that are to be fed to the path feedback control 7.

Which destination path data or values 5 from the conversion module 15 and which feedback data 16, 17 from the path dynamic 13 or from the conversion module 15 are sent to the path dynamic feedback control 11 or processed by this control depends, on the one hand, on the type of use, and on the other hand, on the range of the destination path 20 to be determined. According to the invention, however, depending on the demand on the path generation 3, derivations can be provided at least temporarily both for the velocity and acceleration values with the destination path data or values 5 and/or with the feedback data 16, 17, as well as third or further derivations of the destination path 20 or of the coupling path 25 formed with reference to time or with reference to the distance.

Independent of whether velocity values, acceleration values, or values of further derivations are fed by means of the destination path data or values 5 or the feedback data 16, 17 to the feedback control device 11, the processing of the destination path data or values 5 and the processing of the feedback data or values 16, 17 in the feedback control device 11 do not always have to be active simultaneously. In a preferred embodiment of the invention, the processing of these data in the feedback control device 11 is activated depending on the instantaneous progression of the coupling process, that is, it depends on how the coupling path 25 and the destination path 20 run relative to one another. In the normal case, for example, the processing of the destination path curvature as an element of the destination path data or values 5 is done only in the final phase of the coupling, that is, shortly before the vehicle reaches the destination path 20. By processing the destination path data or values 5 in the feedback control device 11 it can be achieved that the coupling path 25 merges with the destination path 20 without overshooting.

It can be provided that several types of coupling paths 25, for example, in addition to one-dimensional, also two- and three-dimensional coupling paths 25, may be generated by the path generation 3. In addition to the spatial dimensions, still other additional dimensions can be generated for the coupling paths, for example, by generating an additional variable velocity instead of a constant velocity. In the preferred example embodiment, the corresponding mode of operation is to be selected prior to the generation process. In this way, the destination-path rated input 4c that is linked with the mode of operation, can be automatically generated as a feedback control target or a predetermined rated path input. It can, however, also be provided that the feedback control target is to be predetermined in addition, for example, by a manual input.

The system described for generating a coupling path 25 can in general be used for any vehicle that moves in space and that is to be led to a destination path 20. In addition to aircraft and spacecraft, terrestrial vehicles such as automobiles or ships can also be taken into consideration for this purpose.

The arrangement of the units shown in the Figures, such as the path dynamic feedback control device 11, the path dynamic unit 13, or the conversion module 15 for calculating destination path values, represents a functional arrangement which is independent of in which modules of the corresponding computer units these units are implemented.

According to the invention several path generations 3 can also be networked with another to communicate with each other either simultaneously or in a time sequence.

Furthermore, the described path generation 3 can be expanded analogously for the generation of coupling paths with more than two dimensions. For example, a coupling path described by the three spatial coordinates can be generated. In addition, a variable velocity characteristic or time progression can be generated as a further dimension relative to the spatial dimensions.

Figure 5:
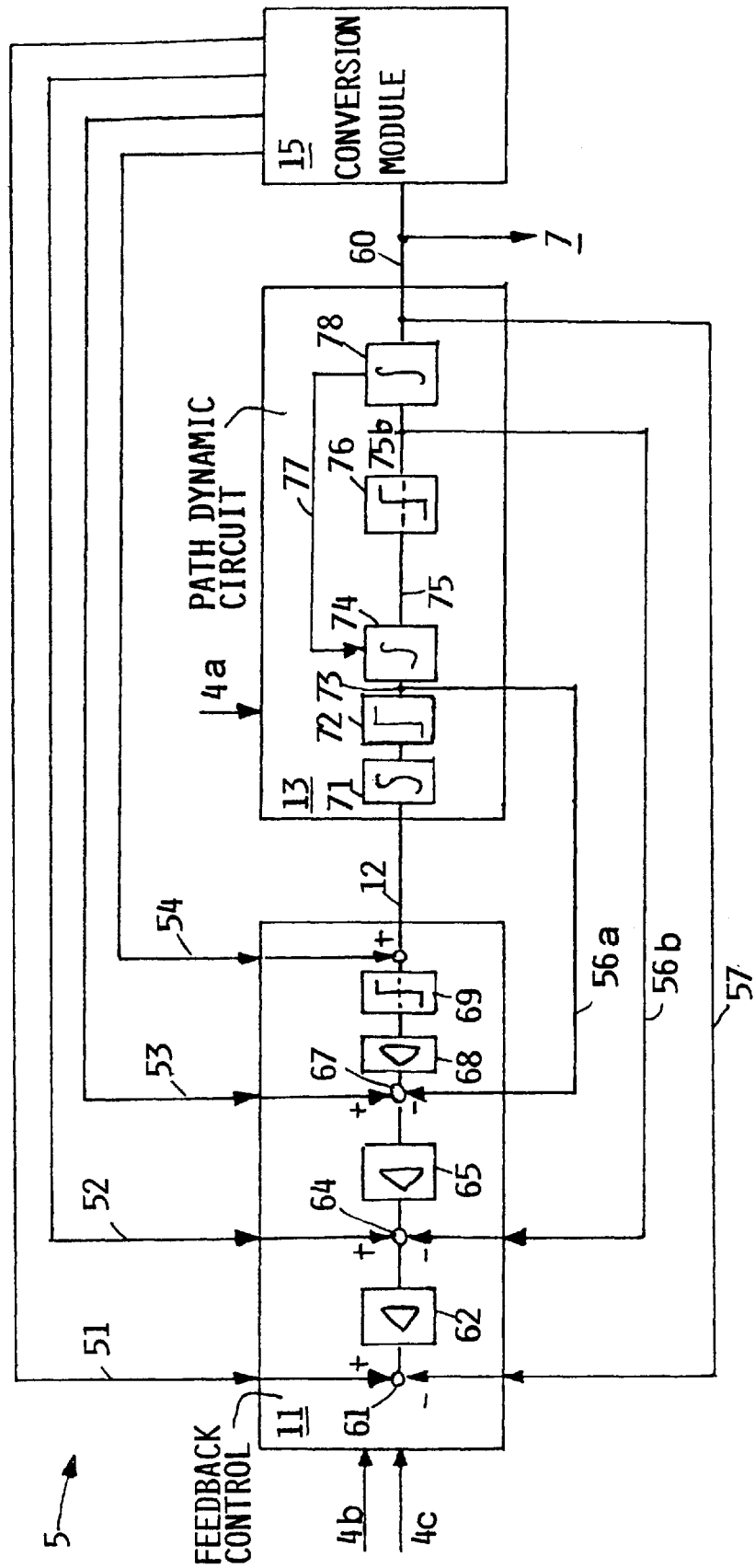
FIG. 5 the structure of the path generation according to the invention for an application case in which a coupling path that runs in the vertical plane, is generated for a destination or target path given as a course of altitude.
Figure 6:
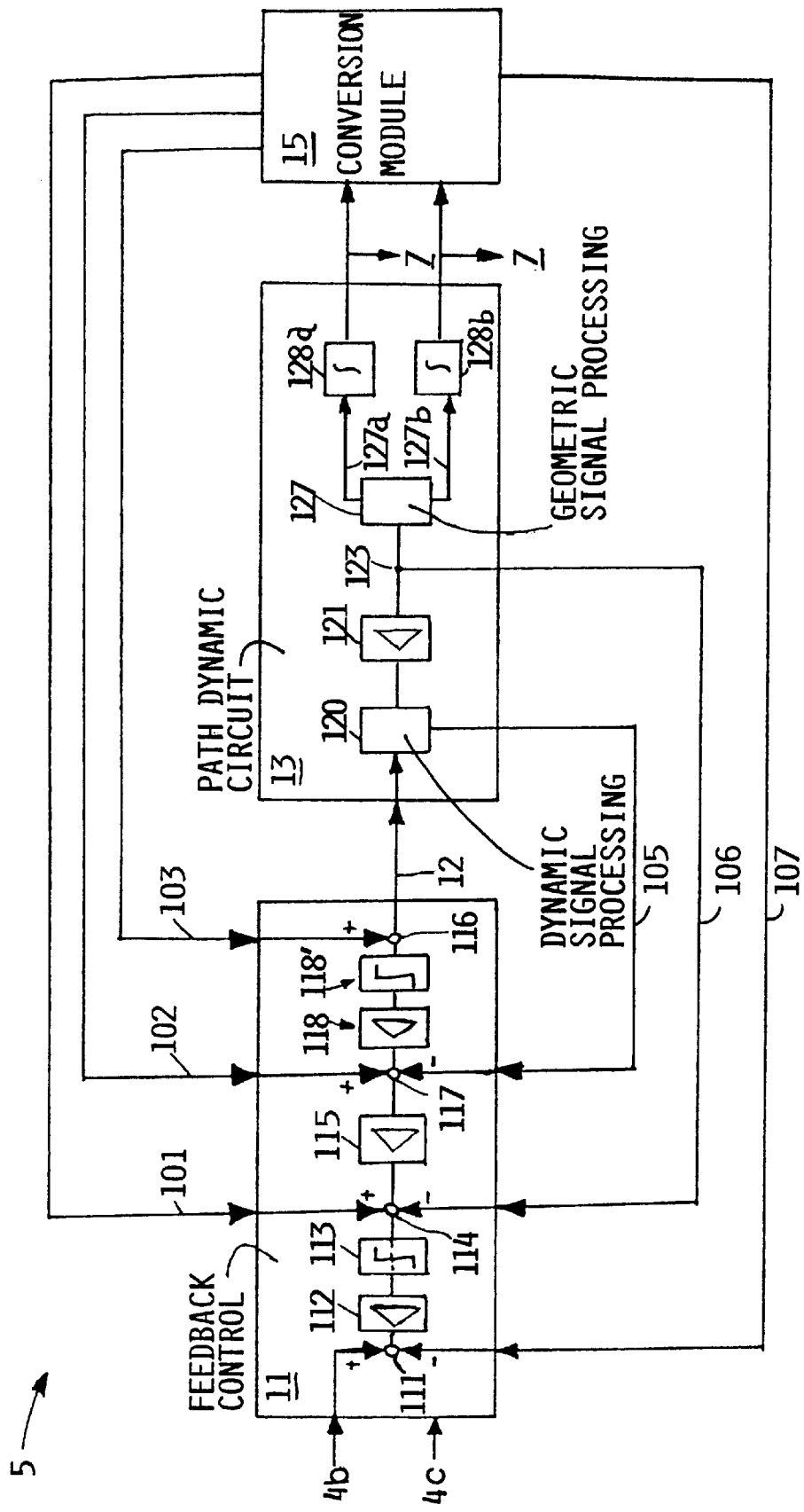
FIG. 6 the structure of the path generation according to the invention for a further application case, in which a coupling path that runs in the horizontal plane is generated for a destination or target path also running in the horizontal plane.

Referring to FIGS. 5 and 6, types of use of the path generation 3 of the invention will now be described, whereby components that functionally correspond to those described with reference to FIGS. 1 to 4 have the same reference numbers.

Referring to FIG. 5 an example of use is described wherein a vertical coupling path 25 to an altitude course that is specified as the destination path 20, is generated for an aircraft. The coupling path 25 and the specified altitude course are thus one-dimensional paths.

In order to start the process of path generation, the path dynamic 13 the initiating values 4$a$, here concretely the altitude at the time point zero, and its derivation over time. The feedback control device 11 receives the mode of operation inputs 4$b$ and the destination-path rated inputs 4$c$.

The destination path data or values 5 that are fed by the conversion module 15 to the feedback control device 11, are relevant for the respective calculation cycle. These data or values 5 can include the destination path position, which in this example is a corresponding altitude value 51 of an altitude course, the vertical velocity of the destination path or the direction of the destination path, for example with reference to a coupling path value 52, in particular the instantaneous slope value of the destination path, the acceleration of the destination path or the destination path curvature value 53 in the direction of the coupling path, and the change in the destination path acceleration value 54 in the direction of the coupling path. These data or values 5 are time or distance dependent. Further, depending on the mode of operation or on the phase of the generation process, one or more of the data or values 51, 52, 53, 54 is/are supplied to the feedback control device 11 in a calculation cycle.

Furthermore, in the use example shown in FIG. 5, the acceleration or curvature values 56$a$ of the coupling path 25, the velocity values 56$b$ of the coupling path 25 and the destination path altitude 57 constitute the feedback data 16 that are fed from the path dynamic 13 to the path dynamic feedback control 11. The feedback 17 shown in FIG. 2, which generally includes new data that are derived from the destination path and from the coupling path, such as the distance between the destination path and the coupling path, is not required in the example of FIG. 5.

The data or values 14, calculated in each calculation cycle by the path dynamic 13, are formed in the use example according to FIG. 5, by the altitude coordinates 60 of the coupling path 25. As shown in FIG. 5, the altitude coordinates 60 are fed to the path feedback control 7 in each calculation cycle with which the aircraft is guided along the generated coupling path 25. On the other hand, the altitude coordinates 60 are passed on to the conversion module 15 that calculates the destination path data or values 5 or the data or values 51, 52, 53, 54, among other data, with the aid of the destination path geometry and the flight velocity that is determinative for the respective calculation cycle.

The path dynamic feedback control 11 processes in each calculation cycle the respective relevant destination path position based on the altitude value 51 from which the respective relevant altitude 57 of the coupling path 25 is subtracted at that location or at a differentiating point or summing circuit 61. Conventional closed loop control elements may be provided downstream of the summing circuit 61. As shown in FIG. 5, an amplifier 62 is provided.

A velocity component or value 56$b$ of the coupling path 25 is subtracted from the destination path vertical velocity value 52 downstream of the transmission element, e.g. an amplifier 62, at a further differentiating point or summing circuit 64. Subsequently, the then resulting feedback control value or signal is processed by an amplifier 65 and, if applicable, by a limiter circuit and by further conventional elements not shown, but depending on the type of use. The destination path acceleration or curvature value 53 is added to the then resulting signal value by a summing circuit 67 and, optionally, the acceleration and/or curvature component or value 56$a$ is subtracted. The then resulting feedback control value is processed by at least one amplifier 68 and, optionally, by a following limiter circuit 69. Hereafter, any change in the acceleration value 54 is added. The then resulting signal forms the data or values 12 which constitute the input data for the path dynamic 13 in the use example according to FIG. 5.

The described processing of the feedback data or values 56$a$, 56$b$, 57 and of the destination path data or values 5 or 51, 52, 53, 54 does not have to take place completely in each cycle. Depending on the phase of the path generation, only one, two or three destination path data or values 51, 52, 53, 54, that is, a subset of the same, and also a subset, for example, only of the feedback values 16, 17, or 56$a$, 56$b$, 57 can be fed in a cycle to the feedback control 11. The signal or value 56$b$ is picked up at a tap 75$b$ downstream of the signal limiter 76.

The path dynamic 13 can include an optional acceleration filtering unit 71 that integrates the input data or values 12 and feeds its output to a limiter circuit 72. With the limiter circuit 72 the acceleration limit values can be taken into consideration with respect to the coupling path 25. The output signal 73 of the limiter circuit 72 is fed back to the feedback control device 11 as an acceleration or curvature component or value 56$a$ of the coupling path 25. The output signal 73 corresponds to a lateral acceleration value of the coupling path 25, based on an assumed flight velocity or a double derivation of the coupling path 25 with reference to time or distance. The output signal 73 is then integrated within the path dynamic 13 by means of an integrator 74 and processed to form a signal 75 that corresponds to the first derivation of the altitude course of the coupling path with reference to time. A limiter circuit 76 limits the signal 75 to form a signal 75$b$ which is fed back to the feedback control 11 as a velocity component or value 56$b$ of the coupling path 25. A maximal altitude climbing speed that is rated for the vehicle, can be taken into account in the path dynamic 13 through the signal limiter element 76. When the limiter 76 is in effect, the signal 75$b$ is also fed through an integrator 78 as a signal 77 to the integrator 74, whereby the integrator 74 receives narrower limiting values. The signal 75$b$ at the output of the limiter 76 is integrated by the integrator 78 with the altitude coordinates or values 60 that, on the one hand, are fed to the path feedback control 7, and on the other hand, to the conversion module 15.

The individual function components of the feedback control 11 and the path dynamic 13, and the determination of their parameters, result from the particular use example and also from the respective processing phase. For example, the parameters for the amplifiers 62 and 65 result, in particular, from two requirements. On the one hand, the attenuation of the control circuit shall be one in order to avoid overshooting the coupling path. On the other hand, the natural frequency of the control circuit can be determined so that at a higher natural frequency the coupling path 25 approaches more quickly the destination path 20. The physical limits of the vehicle are reflected in the non-linear signal limiters 69 and 76 that can be optionally provided in the feedback control 11 and in the path dynamic 13 respectively. The altitude coordinates 60 that are fed to the path feedback control 7 can, for example, be passed on in the form of the signal 75b representing a vertical velocity value in combination with the specified or given velocity or in the form of position data for the coupling path 25. As of a certain time point of the coupling procedure, that is, when a distance to the destination path falls below a certain distance, all non-linear limiters become ineffective and the control circuit obtains or assumes linear properties or characteristics. Thereby, and in connection with a preset attenuation with the value one, a coupling path 25 is generated that approaches the destination path 20, including one having any curvature characteristic and merges into the destination path without overshooting. The altitude difference or the difference in the climbing rate between the coupling path 25 and the destination path 20 are steady and decrease monotonously down to the value zero, because the attenuation is equal to one. Because of the two integrators connected in series, and due to a destination path without jumps in the climbing rate, the coupling path also does not have jumps in the climbing rate, that is, it is free of breaks. With the help of a limit for the distance between coupling path 25 and the destination path 20, it is possible to determine when the coupling path 25 will reach the destination path 20. When this time point has been reached, the path generation 3 is switched off and the destination path 20 is transferred to the path feedback control 7. By initialization with the values that were measured at the beginning for the destination-path rated inputs 4c, in the given use example these values are the altitude and the climbing rate, it is achieved that the path generation 3 is ready to start at any possible starting situation of the vehicle.

FIG. 6 shows a further example of use of the path generation according to the invention. In this further example, a horizontal coupling path 25 is generated for a horizontally running destination path 20. This further example can relate to aircraft, or land vehicles or ships. In this case the path generation is two-dimensional. According to FIG. 6, a feedback control 11, a path dynamic 13, and a conversion module 15 are also provided in the path generation 3 of the invention. Destination path data or values 5 are fed by the conversion module 15 to the feedback control 11, which further receives the feedback data or values 16 from the path dynamic 13 and feedback 17 from the conversion module 15. To initialize the process, initialization values or signals 4a are fed to the path dynamic 13 and, among other things, serve as initial values for the integrators provided in the path dynamic 13. Furthermore, at the begin of the process, mode of operation data 4b and destination-path specified or rated inputs 4c are fed to the feedback control 11. In the example according to FIG. 6, the destination-path specified or rated inputs 4c receive preferably the value zero for the rated distance between the coupling path 25 and the destination path 20.

In the example of FIG. 6, the destination path data or values 5 are preferably selected from the following: the destination path angle component or value 101a in the x-y coordinate system 29a (FIG. 3) or the destination path velocity component or value 101, respectively in the direction of the coupling path 25, the destination path lateral acceleration component or value or the destination path curvature component or value 102 in the direction of the coupling path 25, and the change of the destination path lateral acceleration component or value or the change of the destination path curvature component or value 103, respectively, in the direction of the coupling path 25. The above mentioned change has reference to time or to the distance of the destination path 20 from the coupling path 25. Furthermore, in the present example of FIG. 6, the lateral acceleration or curvature value 105 of the coupling path 25 and the coupling path direction angle value 106, designated in the x-y coordinate system 29a of FIG. 3 with the reference number 101b, or the coupling path velocity value 107, for example, formed respectively in the direction of the destination path 20 for the feedback 16. The distance value 27a shown in FIG. 3 between the destination path 20 and the coupling path 25 is used for the feedback 17, whereby the distance is to be defined depending on the particular type of use and depending on the generation phase.

Referring further to FIG. 6, within the feedback control 11 the coupling path velocity values 107 are subtracted from the destination-path rated inputs 4c by the difference forming circuit 111. The resulting output signal at the output of the circuit 111 is fed to an amplifier 112 and then to a limiter circuit 113. Then, the destination path velocity value 101 is added to the feedback control signal and the coupling path direction angle value 106 is subtracted by a summing circuit 114 downstream of the limiter circuit 113. The feedback control signal is then amplified by an amplifier 115 and the destination path lateral acceleration or curvature value 102 is added to the signal. Optionally, the lateral acceleration or curvature value 105 is subtracted by a summing circuit 117 from the feedback signal. Downstream of the summing circuit 117 the feedback control signal is preferably again amplified by a further amplifier 118 and a further limiter 118'. Finally, still optionally, the change of the destination path lateral acceleration or curvature value 103 is added by an adder 116, whereby the data or values or signals 12 are formed which are fed to the path dynamic 13.

The described structure of the feedback control 11 may include additional transmission or circuit elements or it may comprise a lesser number of circuit elements. Additional conventional circuit structures can also be integrated into the feedback control 11, for example, an input control device in order to accelerate the feedback control.

Furthermore, not all destination path data or values 5 or 101, 102, 103 must be fed to the feedback control 11 in a calculation cycle. Depending on the type of use and on the phase of the generation process, none or a subset of the values 101, 102, 103 can be fed to the feedback control 11.

In the path dynamic 13 the signal is fed optionally to a dynamic circuit 120 and then, depending on the type of use, to additional transmission elements 121 such as amplifiers or limiters. The resulting or output signal 123 for the coupling path direction angle then forms the feedback data or signals 16 which in FIG. 6 are the coupling path angular direction signal or value 106 or the velocity value 107 which are fed to the feedback control 11. A kinematic cross-linking circuit 127 receives the output signal 123. This cross-linking operation reprocesses the coupling path direction value 106 or velocity 107 in the direction of the destination path 20 into the derivations over time of the values of the corresponding two-dimensional coordinates. Essentially geometrical operations are carried out in the kinematic cross-linking circuit 127. The data or values or signals 127a for the first dimension or coordinate are fed to an integrator circuit 128a, and the data or signals or values 127b for the second dimension or coordinate are fed to an integrator 128b, whereby the feedback values or signals receive a value that corresponds to the coordinates of the coupling path 25 and which are fed to the path feedback control 7 or 11. These data or signals are then fed to the conversion module 15 which, in the present example, calculates the distance components, the angle components, the curvature components and the lateral acceleration components of the destination path 20, and thus, calculates the destination path data or signals or values 5 or 101, 102, 103.

The process of path generation takes place preferably in several phases. Depending on the type of use and on the phase for which the path generation 3 generates the data or signals for the coupling path 25, single control loops cannot be operated in the feedback control 11 and/or in the conversion module 15. Thus, for example, there is no feedback of the distance value 27a. Individual destination path data or values or signals 5 cannot be used; so that, for example, there is no destination path lateral acceleration or curvature value 102.

Which phases within a path generation process and which switchovers into a next phase can be provided will now be described in the following example with further reference to the example of use according to FIG. 6.

The switch-over into the next phase is done preferably, depending on the distance value between the coupling path coordinates and the destination path coordinates. Such distance value exists in a calculation cycle. In this context, preferably the distance taken into account is the shortest distance in a calculation cycle between the relevant coordinates of the coupling path 25 and of the destination path 20.

The first phase is then activated in case the vehicle has a distance greater than a specified value, for example 1000 m, to the destination path. In this first phase, the complete path generation 3 according to the invention is not in operation. Rather, only a destination path direction feedback control of the vehicle is performed and that, for example, perpendicularly to the destination path 20. Thereby, the value +/−90° is added to the destination path angle value 101a. The destination path lateral curvature value 102 and the feedback 17 or coupling path velocity value 107 are not fed back, while the coupling path angular direction value 106 is fed back.

In the second phase that begins when the vehicle has a lesser distance to the destination path 20 than the specified value, the vehicle swings into the direction of the destination path 20. In this second phase, the path generation 3 according to the invention is thus also not completely in operation and only the destination path angle value 101a without, however, adding the +/−90° and the coupling path direction value 106 are fed back.

The third phase begins when the vehicle has turned in a direction that lies at the most in a certain angle relative to the relevant section of the destination path 20. In this case the data or values 4a, 4b, 4c are first fed to the corresponding modules of the path generation 3 for activating the generation. Preferably, the destination path data or values 5 or 101, 102, 103 and the feedback data or values 16, 17 or 105, 106, 107 are then switched on stepwise or altogether, whereby also a subset of the destination path data or values 101, 102, 103 and of the feedback data or values 106, 107 are also completely fed back.

The path generation 3 continues to work in the third phase until the distance between the coupling path 25 and the destination path 20 has achieved a predetermined limit value. At this time the fourth phase of the path generation process begins. In this phase the data of the destination path 20 are fed directly to their path feedback control 7, which means the path generation 3 can be deactivated.

The path generations according to the FIGS. 5 and 6 can be switched together to generate a three-dimensional coupling path. In this context, a limiter circuit 76 with the limiting values is required to keep the rise or slopes of the vertical component or value of the coupling path are sufficiently small so that the velocity in the horizontal track does not change too strongly. The velocity in the horizontal plane can then be assumed to be constant so that a switching together of both path generations according to the FIGS. 5 and 6 is achieved with a relatively modest modification effort.

Several methods or systems according to FIGS. 1 and 2 or several example embodiments based on FIGS. 5 and 6 can be combined for a multi-dimensional path generation. This can be done by taking into consideration more than one dimension for the coupling path, for example, by using additional velocity or acceleration progressions or characteristics. Signal and data flows, in particular between the physically corresponding values, are created in such a combination of FIGS. 1 and 2 or 5 and 6.

It is emphasized that as destination path data or values there may be also provided only individual ones of the destination path data or values 51, 52, 53, 54 or 101, 102, 103 or combinations of the destination path data or values shown in FIGS. 5 and 6, or values that are mathematically and physically equivalent to destination path data or values.

With the invention, the non-linear components in the last approach phase of the coupling path 25 to the destination path 20 are eliminated in the feedback control 11. Consequently, the feedback control 11 described above can be referred to as being based on a linear construction method. A corresponding structure of the feedback control 11 can be seen in FIGS. 5 and 6. However, the feedback control 11 can also be constructed differently, in contrast to these Figs. In particular, the feedback control 11 can also be embodied on the basis of non-linear construction methods, that is, the control is non-linear even in the final approach phase of the coupling path 25 to the destination path 20.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method for generating at least one coupling path for guiding a vehicle to a specified destination path, said method comprising the following steps:
   (a) mapping, by a path dynamic unit (13), geometric relationships of said at least one coupling path (25),
   (b) controlling said path dynamic unit (13) through a path dynamic feedback control (11),
   (c) supplying feedback data as signals to said path dynamic feedback control (11) for said controlling of said path dynamic unit (13),
   (d) calculating, in a conversion module (15) connected to an output of said path dynamic unit (13), destination path values as signals (5), and
   (e) feeding at least a portion of said destination path signals (5) as an input value or values to an input of said path dynamic feedback control (11).

2. The method of claim 1, further comprising providing said destination path values as at least one value selected from the group of a destination path position value and a distance value of a distance between said specified destination path (20) and said at least one coupling path (25).

3. The method of claim 1, further comprising providing said destination path values as at least one value selected from the group of a destination path angular value, a destination path velocity value, and a destination path direction value, taken respectively in a direction of said at least one coupling path (25).

4. The method of claim 1, further comprising providing said destination path values as at least one value selected from the group of a destination path acceleration value, a destination path curvature value, a portion of said acceleration value taken in a direction of said at least one coupling path (25) and a portion of said destination path curvature value taken in said direction of said at least one coupling path (25).

5. The method of claim 1, further comprising providing said destination path values as at least one value selected from the group of a modification of a destination path acceleration value and a modification of a destination path curvature value.

6. The method of claim 1, further comprising providing said at least one coupling path (25) in the form of position data or values and supplying said position data or values to a path feedback control (7).

7. The method of claim 1, comprising generating said at least one coupling path as a multi-dimensional coupling path.

8. A system for generating at least one coupling path (25) for guiding a vehicle to a specified destination path (20), said system comprising a path dynamic unit (13), a feedback control (11) connected to said path dynamic unit for a closed loop control of said path dynamic unit (13), at least one feedback conductor for sending feedback data to said feedback control (11), a conversion module (15) connected to an output of said path dynamic unit (13) for calculating destination path values (5), said conversion module (15) comprising an output connected to an input of said feedback control (11) for feeding said destination path values (5) as input values to said feedback control (11).

9. The system of claim 8, comprising at least two systems as defined in claim 16, and coupling means interconnecting said at least two systems for forming a multi-dimensional system.

10. The system of claim 8, wherein said at least one coupling path is a multi-dimensional coupling path.

* * * * *

UNITED STATES PATENT AND TRADEMARK OFFICE
CERTIFICATE OF CORRECTION

PATENT NO.    : 6,289,270 B1
DATED         : September 11, 2001
INVENTOR(S)   : Baumgarten It is certified that error appears in the above-identified patent and that said Letters Patent is hereby corrected as shown below:

<u>Title page,</u>
Item [57], ABSTRACT,
Line 4, after "of", insert -- the path dynamic unit (13), and --;

<u>Column 15,</u>
Line 7, after "from", replace "the" by -- a --;
Line 8, after "said", insert -- destination --;
Line 15, after "from" replace "the" by -- a --;

<u>Column 16,</u>
Line 14, before "comprising", replace "The system of claim 8,"
by -- A combination --; replace "two systems" by -- two of said system --;
Line 2, after "claim", replace "16" by -- 8 --.

Signed and Sealed this

Eleventh Day of June, 2002

*Attest:*

JAMES E. ROGAN
*Attesting Officer*     *Director of the United States Patent and Trademark Office*